Figure 1:
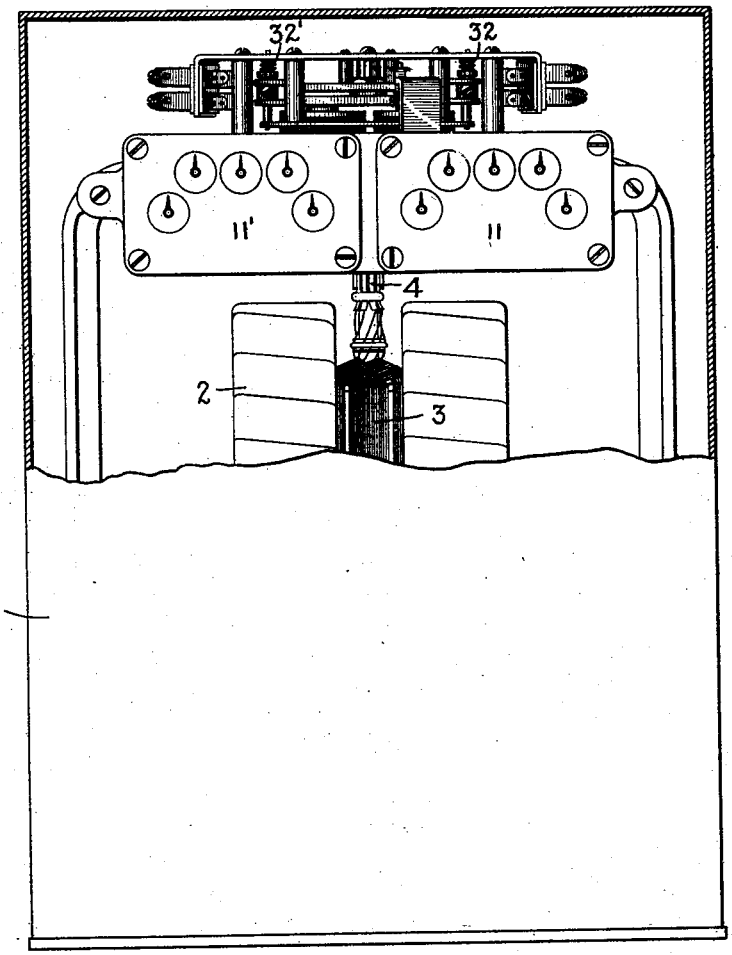

No. 755,757. PATENTED MAR. 29, 1904.
A. J. R. FIEGO.
MULTIPLE RATE METER.
APPLICATION FILED JULY 21, 1903.
NO MODEL. 3 SHEETS—SHEET 1.

Witnesses:

Inventor
Alexander J.R. Fiego.
By Albert H. Davis
Att'y.

No. 755,757. PATENTED MAR. 29, 1904.
A. J. R. FIEGO.
MULTIPLE RATE METER.
APPLICATION FILED JULY 21, 1903.
NO MODEL. 3 SHEETS—SHEET 2.
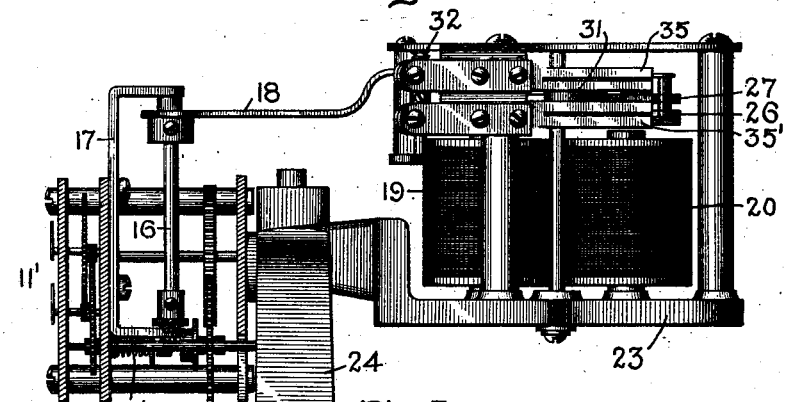
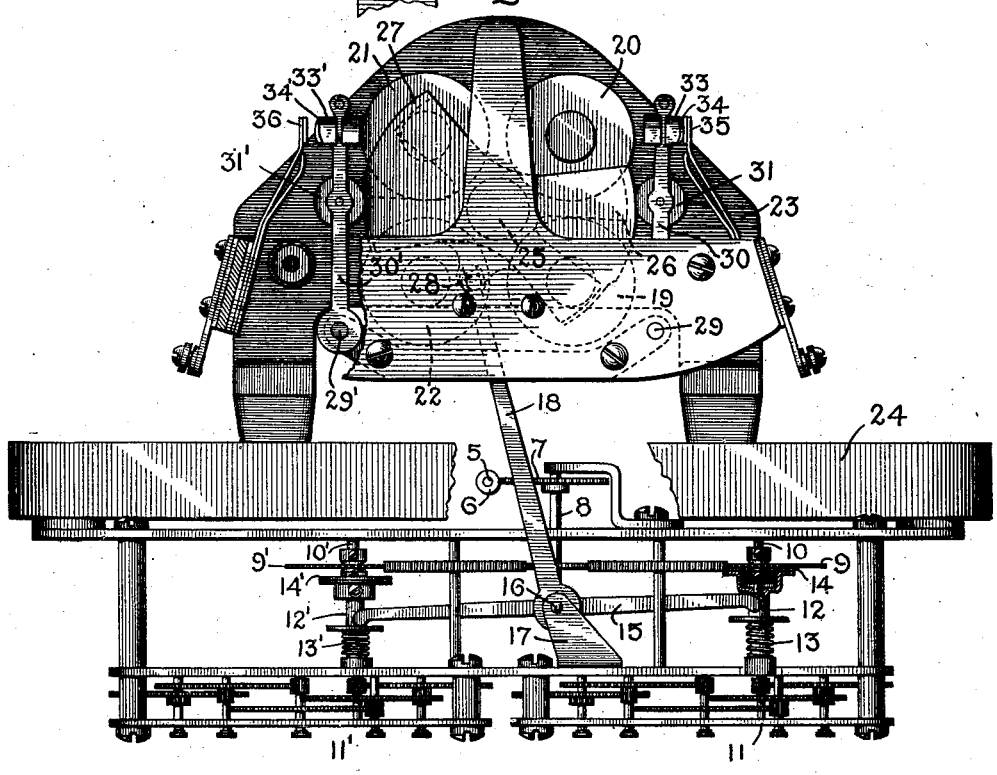
Witnesses:
Inventor
Alexander J. R. Fiego
By
Att'y.

No. 755,757. PATENTED MAR. 29, 1904.
A. J. R. FIEGO.
MULTIPLE RATE METER.
APPLICATION FILED JULY 21, 1903.
NO MODEL. 3 SHEETS—SHEET 3.

Witnesses:

Inventor,
Alexander J. R. Fiego,
By
Att'y.

No. 755,757. Patented March 29, 1904.

UNITED STATES PATENT OFFICE.

ALEXANDER J. R. FIEGO, OF LYNN, MASSACHUSETTS, ASSIGNOR TO GENERAL ELECTRIC COMPANY, A CORPORATION OF NEW YORK.

MULTIPLE-RATE METER.

SPECIFICATION forming part of Letters Patent No. 755,757, dated March 29, 1904.

Application filed July 21, 1903. Serial No. 166,431. (No model.)

*To all whom it may concern:*

Be it known that I, ALEXANDER J. R. FIEGO, a citizen of the United States, residing at Lynn, county of Essex, State of Massachusetts, have invented certain new and useful Improvements in Multiple-Rate Meters, of which the following is a specification.

This invention relates to an electric meter or similar instrument of the multiple-rate type. Devices of this kind are well known in the art, their purpose being to afford station managers a means for inducing their customers to use electric energy more freely during periods of light load, so as to keep the load on the station more nearly uniform.

The invention relates more particularly to the type of multirate meter shown in the patent to Cox and Holmes, No. 679,472, wherein there are two recording-dials and two clutches and clock-controlled mechanism operating the clutches to connect the dials to the meter-shaft alternately. In such a construction the load on the clock is the load of operating the entire clutch mechanism. This requires a clock that is very large and expensive, and the liability of inaccuracy and breakage is greatly increased. To avoid the employment of such a clock, I have provided an electromagnetic device of peculiar construction to operate the clutches or other rate-changing devices instead of the clock-operated mechanism shown in the above-mentioned patent. I use a clock with the device; but the function of the clock is merely to close a circuit through the magnets, and to do this the contacts can be so arranged that the power required for this purpose is inappreciable. With my device it is also possible to use a control-circuit running to the electromagnetic devices in any number of meters and have a single clock complete this circuit, and thus operate the clutches in all of the meters to change the recording from one dial to another or vary the rate of recording on the same dial.

The features of novelty in the construction and operation of my improved multirate meter will be set forth more fully hereinafter and will be definitely indicated in the appended claims.

Figure 4:
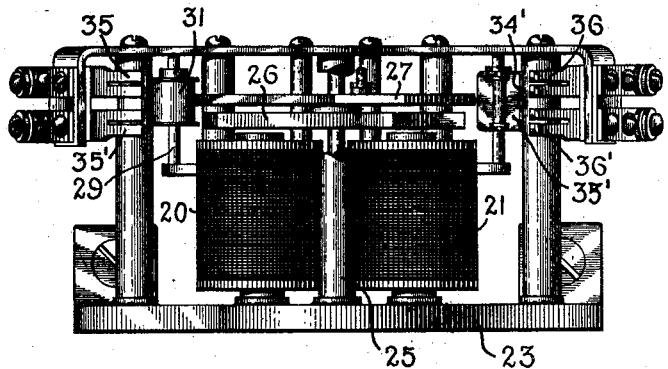
Figure 5:
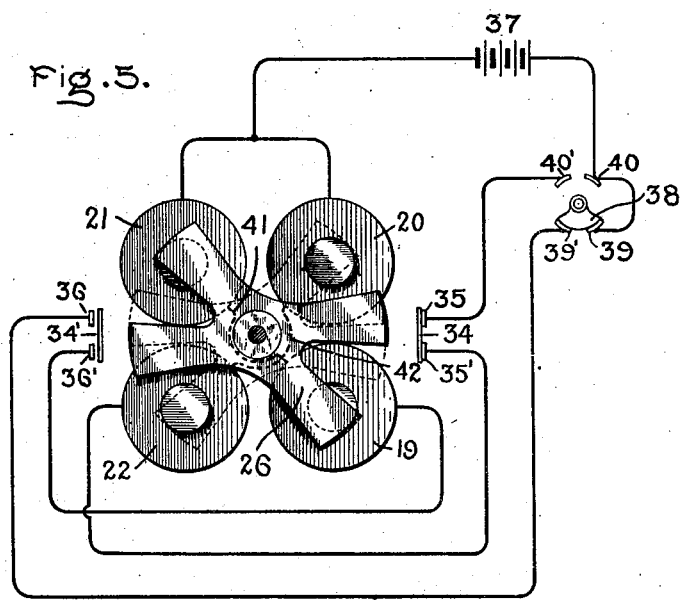

In the accompanying drawings, which illustrate one embodiment of my invention, Figure 1 shows a wattmeter with the casing broken away in part to show the two dials and the electromagnetic device for changing the recording from one dial to the other. Fig. 2 is a side elevation of the electromagnetic devices and the recording mechanism. Fig. 3 is a top plan of the same. Fig. 4 is a back view of the electromagnetic device, and Fig. 5 is a diagram of the circuits.

In Fig. 1, 1 indicates a wattmeter of ordinary construction, the one shown in the drawings being the well-known Thomson recording-wattmeter, having a pair of field-coils 2 and an armature 3 and commutator 4, carried by the spindle 5, on which is mounted a worm 6. In mesh with worm 6 is a worm-wheel 7, mounted on a shaft 8, which communicates motion to a train of gears driving two loose wheels 9 9', turning, respectively, on shafts 10 10' in gear with two recording-dials 11 11'. Splined on the shafts 10 10' are sleeves 12 12', thrust forward in a direction to engage the loose-wheels 9 9' by coil-springs 13 13'. The clutching-face of the sleeves 12 12' may be covered with leather or other suitable gripping material, as indicated at 14 14', to establish a good frictional relation between the clutch-disk and the loose wheels when the two are in engagement. The clutching relation is established by the lever 15, controlled by an electromagnetic device. The arms of this lever extend into grooves in the clutch-sleeves, shifting them alternately in and out of clutching relation to the coöperating gear-wheels. As shown in Fig. 3, the clutch-piece 12 has been released by the lever and thrust by spring 13 into engagement with the loose wheel 9, thereby connecting the shaft 10 and the dial-train 11 with the power-shaft 8. The clutch-piece 12' has been forced by the other arm of the lever 15 against the tension of the spring 13' to a position in which the clutching-face is entirely out of contact with the loose wheel 9'. The wheel 9' is therefore free to turn on its shaft, and the counter 11' not only does not register, but is locked against any movement whatever by the pressure of the arm of lever 15 against the sleeve 12'. The dial-train 11 records, however, and there is no frictional resistance to its movement except the friction of the train of gears, for when the arm 15 releases clutch-piece 12 it moves entirely out of contact therewith, as shown in Fig. 3. The lever 15 is rigidly secured to a post 16, pivotally mounted in a frame 17, fastened to the back of the box containing the dial-trains. The lever 15 and the clutches 12 and 12' are shifted by an arm 18, rigidly secured to the pivoted post 16 near its upper end and extending backward therefrom.

The mechanism for rocking the arm 18 about its pivot, and thereby operating the clutches, consists of four electromagnets 19, 20, 21, and 22, mounted vertically on a platform 23, secured to the frame 24 of the meter. The magnet-spools are arranged about a pivoted post 25, on which is rigidly mounted above the magnet-spools a plate 26, having two bifurcated arms, as indicated in Figs. 3 and 5. This plate 26 constitutes the armature of the magnets, and its shape is such with respect to the cores of the magnet-spools that when magnets 20 and 22 are energized the armature and the post 25 are rocked through a small arc, bringing two of the fingers of the armature directly over the cores of the magnets, and when those magnets are deënergized and the coils of magnets 19 and 21 connected in circuit the armature 26 is rocked back to the position shown in Figs. 3 and 5. Rigidly mounted on the post 25 above the armature 26 is a cam-plate 27, preferably of brass, having curved ends, the radius of curvature being shorter for a portion of the length of the curved ends than for the balance, as shown in Fig. 3. This cam-plate being secured to the post 25 is rocked back and forth with the armature 26. On the upper side of the cam 27 is a stud 28. The inner end of the arm 18 is slotted, as shown in Fig. 3, and the stud 28 fits within this slot, so that as the magnets rock the armature 26 and cam 27 on the pivoted post 25 the stud 28 moves the free end of arm 18 from side to side, thus turning the pivoted post 16 and the lever 15, secured thereto, and operating the clutches, as above described.

Pivotally mounted in the upper part of the frame of the electromagnetic device are two short shafts 29 29', on each of which is rigidly mounted an arm 30 30'. A roller 31 31', preferably of brass, is mounted in each of the arms 30 30' and is adapted to bear on one of the curved ends of the cam 27, the rollers being held against the cam by springs 32 32', coiled around the short shafts 29 29' and each having its ends secured one to the frame and the other to the arm. The arms 30 30' carry fiber blocks 33 33' in their free ends, the outer surfaces of which are tipped with silver strips, as indicated at 34 34'. Mounted on each side of the frame is a pair of spring-contacts 35 35', and 36 36', each pair in coöperative relation to one of the silver tips 34 34' and arranged to be bridged thereby when arm 30 or 30', carrying the silver tip, is thrown to the outer position by a movement of the cam 27.

The electrical connections to the magnetic operating device are shown diagrammatically in Fig. 5, in which 37 is a source of electric energy and 38 a conducting-segment driven intermittently by clock mechanism to make one revolution in twenty-four hours. The contacts 39 39' and 40 40' are arranged in coöperative relation to the segment 38 and adjustable around its path of movement. The clock mechanism may be self-winding and with the contacts may be within the meter-casing, and the source of energy 37 may be the supply-wires, or the mechanism may be located at any desired point distant from the meter, and the control-wire leading thereto may run to any number of meters. The coils of the magnets 19 and 21 are connected in series by the wire 41 and the coils of magnets 20 and 22 by wire 42. The contacts 39 39' and 40 40' are adjusted so that each pair will be bridged by the segment 38 at the time when the change of rate is to be made. When the segment 38 has been turned by the time movement so that it bridges contacts 40 and 40', which may be in the evening, when the load on the central station has become light and it is desired to supply electric energy at a lower rate, a circuit is closed from battery 37 across contacts 40 and 40' by segment 38 to contact 35. As the bridging-strip 34, carried by the fiber block 33 on arm 30, is held in the outer position by the roller 31 of arm 30, being on the portion of the end of cam 27 having the greater radius of curvature, a bridging connection is made by strip 34 from contact 35 to contact 35', and the circuit is completed through the coils of magnet 22, then by wire 42 to the coils of magnet 20, and back to battery 37. Magnets 20 and 22 being thus energized attract armature 26, turning it and cam 27, both of which are secured to the pivoted post 25. By this movement the position of stud 28, carried by cam 27, is shifted, carrying with it the free end of arm 18, thereby operating the lever 15 to release one of the clutches and press the other back against the tension of its spring, as above described. When the cam 27 has been shifted nearly to the end of its range of movement, the roller 31 rides on the portion of the end of cam 27 having the smaller radius, the roller being held against the cam by the spring 32. This carries the silver strip 34 away from contacts 35 35', breaking the connection between them. At the other end of the cam 27 a reverse movement occurs, the strip 34' being brought into bridging connection with the contacts 36 36'; but all circuits from the battery 37 are open, that through magnets 20 and 22 at contacts 35 35' and the circuit through magnets 19 and 21 at contacts 39 39'. This relation is continued until the period of heavy load begins and segment 38 bridges contacts 39 39', completing the circuit through magnets 19 and 21, which rock the armature and cam back to the position shown in the drawings, connecting the opposite dial to the meter-shaft and locking the other dial against movement. When the armature has been rocked by either pair of magnets and all the magnets are deënergized, any movement of the armature is prevented by one of the rollers 31 31' bearing against the inclined portion of the end of the cam connecting the two curved portions of different radii.

The gearing between the shaft 8 and shafts 10 10' may be such that the latter turn at different rates with respect to the former, in which case the same amount could be charged per unit for the units shown on the two dials, or the gearing could be such that the shafts 10 10' turn at the same rate with respect to shaft 8, in which case different rates for the units shown on the two dials would be established.

From the foregoing description it will be seen that the sole duty of the clock is to close a circuit through one of the pairs of electromagnets twice in twenty-four hours, and for this purpose very little power is required of the clock, which may therefore be small, compact, and inexpensive.

I have illustrated and described herein the embodiment of my invention which I prefer to use; but I do not wish to be understood as limited in any way to what is shown, as many modifications may be made therein without departing from the spirit of my invention.

What I claim as new, and desire to secure by Letters Patent of the United States, is—

1. A multirate meter comprising a meter-motor, two dial-trains, a plurality of electromagnets, a clock, means whereby the clock closes circuit to the electromagnets at determinate hours, means actuated by the magnets for alternately connecting the dial-trains with the meter-motor, and means for preventing the rotation of either train when disconnected from the motor.

2. A multirate meter comprising two counters, a meter-motor, clutches on the driving-shaft of the counters impelled toward engaging relation to the motor, a plurality of electromagnets, and a shifting device actuated thereby engaging either clutch when disengaged from the motor but disengaged when connected with the motor.

3. A multirate meter comprising a plurality of dial-trains, a clutch on a shaft of each train in driving relation thereto, a plurality of electromagnets and means actuated thereby for operating the clutches, a cam moved by the magnets in operating the clutches, an arm carrying a contact bearing on the cam, and a stationary contact coöperating therewith, said contacts being arranged to open the circuit of the magnets after they have operated the clutches.

4. In a multirate meter, an electromagnetic device for changing the manner of recording, comprising electromagnets, a pivoted armature rocked thereby, a cam-surface moving with the armature, and contacts governed by the cam-surface controlling the circuit of said electromagnets.

5. In a multirate meter, an electromagnetic device for changing the manner of recording comprising an electromagnet, a cam shifted thereby, an arm bearing on the cam-surface, and means whereby the movement of the arm when the cam is shifted opens the circuit of the magnet.

6. In a multirate meter, an electromagnetic device for changing the manner of recording comprising an electromagnet, a pivoted cam shifted thereby, a pivoted arm carrying a contact, a spring pressing the arm against the cam-surface, and means whereby the movement of the arm when the cam is shifted opens the circuit of the magnet.

7. In a multirate meter, an electromagnetic device for changing the manner of recording comprising two electromagnets, a pivoted cam rocked thereby, arms carrying contacts bearing on said cam, and means whereby the movement of the arms when the cam is shifted opens the circuit of the magnet which caused the movement and closes a connection to the other magnet.

8. A multirate meter comprising a meter-motor, a plurality of dial-trains, clutching mechanism, a plurality of electromagnets and means actuated thereby for operating the clutching mechanism to connect the dials alternately with the meter-motor, a cam rocked by the magnets in operating the clutching mechanism, and means whereby the movement of said cam opens the circuit of the magnets which caused the movement and closes a connection to the other magnets.

9. In a multirate meter, an electromagnetic device for changing the manner of recording comprising an electromagnet, a cam shifted thereby, an arm bearing on the cam-surface, means whereby the movement of the arm when the cam is shifted opens the circuit of the magnet which caused the movement, and means for holding the cam in the position to which it is shifted.

In witness whereof I have hereunto set my hand this 16th day of July, 1903.

ALEXANDER J. R. FIEGO.

Witnesses:
 DUGALD McK. McKILLOP,
 CHATTIN BRADWAY.